United States Patent
Vallejo et al.

(10) Patent No.: US 10,750,925 B2
(45) Date of Patent: Aug. 25, 2020

(54) METHOD OF OPERATING A DISHWASHER

(71) Applicant: Whirlpool Corporation, Benton Harbor, MI (US)

(72) Inventors: Alvaro Vallejo, Saint Joseph, MI (US); Sylvan J. Amos, Kalamazoo, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 335 days.

(21) Appl. No.: 15/869,880

(22) Filed: Jan. 12, 2018

(65) Prior Publication Data

US 2019/0216289 A1   Jul. 18, 2019

(51) Int. Cl.
| | |
|---|---|
| A47L 15/48 | (2006.01) |
| B01D 5/00 | (2006.01) |
| A47L 15/42 | (2006.01) |
| B01D 53/26 | (2006.01) |
| F28B 3/02 | (2006.01) |

(52) U.S. Cl.
CPC ......... *A47L 15/483* (2013.01); *A47L 15/4214* (2013.01); *A47L 15/4219* (2013.01); *A47L 15/4291* (2013.01); *A47L 15/488* (2013.01); *B01D 5/0075* (2013.01); *B01D 5/0081* (2013.01); *B01D 5/0084* (2013.01); *B01D 53/265* (2013.01); *F28B 3/02* (2013.01); *A47L 15/4229* (2013.01)

(58) Field of Classification Search
CPC ...... A47L 15/48; A47L 15/483; A47L 15/488; B01D 5/0075; B01D 5/0057
See application file for complete search history.

(56) References Cited

U.S. PATENT DOCUMENTS

| | | | |
|---|---|---|---|
| 8,496,760 B2 | 7/2013 | Bertsch et al. | |
| 8,679,261 B2 | 3/2014 | Brunswick et al. | |
| 8,869,424 B2 | 10/2014 | Hermann et al. | |
| 8,875,721 B2 | 11/2014 | Bertsch et al. | |
| 9,078,555 B2 | 7/2015 | Heisele et al. | |
| 9,907,451 B2 * | 3/2018 | Wu ..................... | A47L 15/483 |
| 2006/0096621 A1 | 5/2006 | Lee et al. | |
| 2010/0300499 A1 | 12/2010 | Han et al. | |
| 2012/0145195 A1 | 6/2012 | Buser et al. | |

FOREIGN PATENT DOCUMENTS

| | | | | |
|---|---|---|---|---|
| CH | 690354 A5 * | 8/2000 | .......... | A41L 15/483 |
| CN | 104739345 A | 7/2015 | | |
| CN | 105520704 A | 4/2016 | | |
| CN | 206950142 U | 2/2018 | | |
| DE | 10250790 A1 | 5/2004 | | |
| DE | 102013106775 A1 | 3/2014 | | |

(Continued)

OTHER PUBLICATIONS

European Extended Search Report corresponding to EP Application No. 18214636.5 dated Jun. 25, 2019.

*Primary Examiner* — Robert A Hopkins
(74) *Attorney, Agent, or Firm* — McGarry Bair PC

(57) ABSTRACT

A method for removing moisture from moist air in an appliance, such as a treating chamber of a dishwasher, wherein a drying system includes a condensing system and heat exchange systems that enhance condensation with both ambient air and cold water. Optionally, the method can also include a charge or charges of warm, ambient air or ambient air with moist air during recirculation of moist air.

20 Claims, 6 Drawing Sheets

(56) References Cited

FOREIGN PATENT DOCUMENTS

| | | |
|---|---|---|
| EP | 0800785 A2 | 10/1997 |
| EP | 2556785 A1 | 2/2013 |
| EP | 2586357 A1 | 5/2013 |
| IT | TO20110985 A1 | 4/2013 |
| KR | 20080067127 A | 7/2008 |

* cited by examiner

METHOD OF OPERATING A DISHWASHER

BACKGROUND

Dishwashers can include a drying system for drying dishes in a treating chamber of the dishwasher. Such drying systems can rely on a static dry, in which air from the exterior of the dishwasher flows into the treating chamber to replace some of the moist air, reducing overall humidity of the treating chamber which aids in the evaporation of moisture from the dishes. A condenser system, through which the air in the treating chamber is circulated through a condenser, can be used to remove the moisture in the air by condensation. Condensing systems are typically operated as either a closed loop system, where they do not introduce ambient air, or an open loop system, where they do introduce ambient air.

BRIEF DESCRIPTION

In one aspect, the disclosure relates to a method of removing moisture from moist air within a treating chamber of a dishwasher, the method comprising recirculating the moist air in the treating chamber through a condenser; during the recirculating, flowing of ambient air over the condenser; and during the recirculating and after the flowing ambient air, flowing cold water over the condenser.

DESCRIPTION

The aspects of the present disclosure are generally directed toward a method for removing moisture from moist air such that drying time of dishes in a dishwasher is reduced. The method includes a drying system having a condensing system, an ambient air heat exchange system, and a cold water heat exchange system that enhance condensation in the condenser. Both ambient air and cold water heat exchanger systems can increase the temperature differential between the wall of the condenser and the moist air. The ambient air and cold water can be used simultaneously or sequentially, with the sequential application providing the greater overall benefit as the process is currently understood. The method can also optionally include one or both of heating the moist air or adding ambient air to the moist air to increase the rate of condensation or evaporation of liquid in the treating chamber into the moist air.

Figure 1:
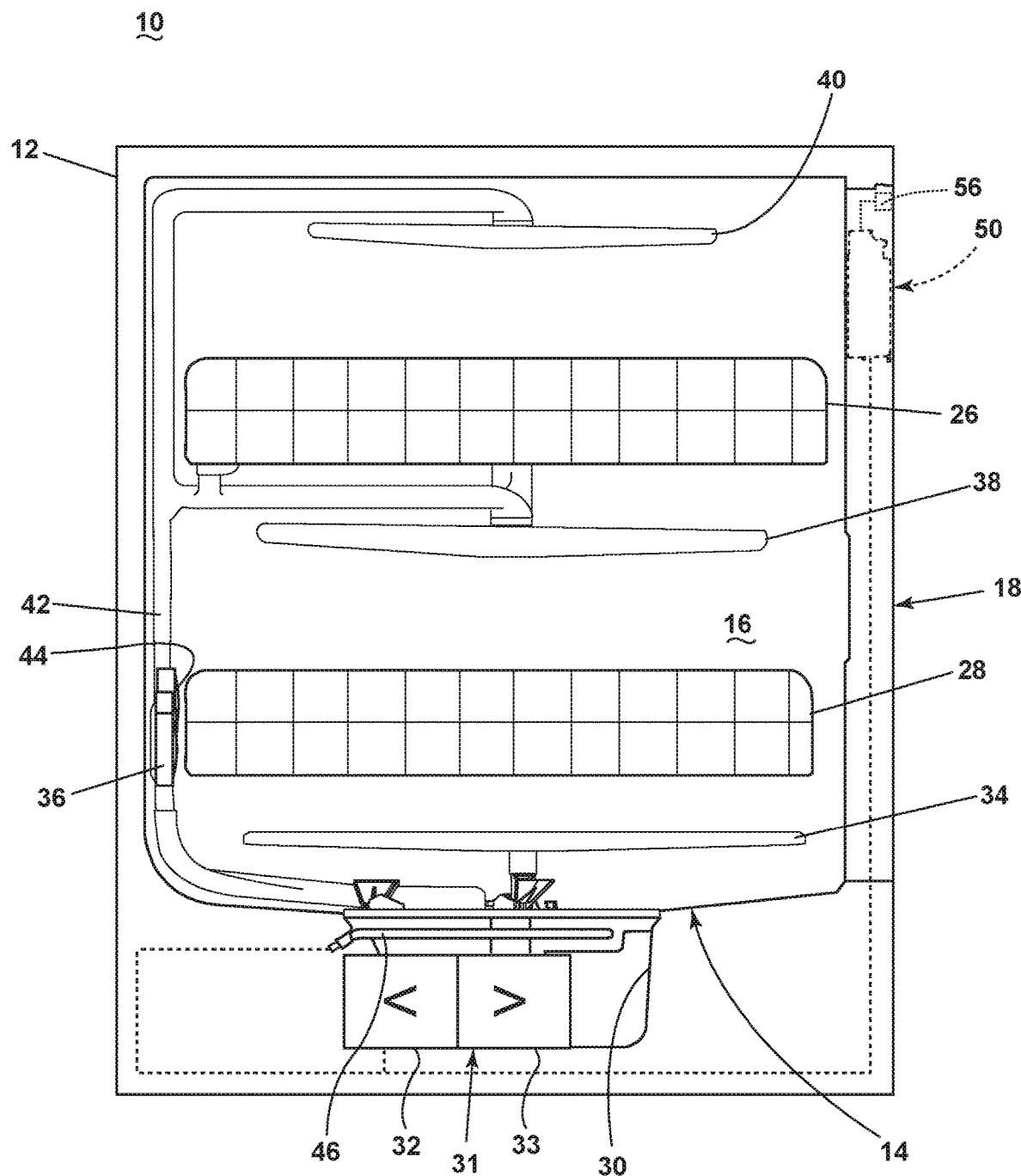
FIG. 1 is a schematic, cross-sectional view of a dishwasher in accordance with various aspects described herein.

In FIG. 1, an automated dishwasher 10 according to an aspect of the present disclosure is illustrated. A chassis 12 can define an interior of the dishwasher 10 and can include a frame, with or without panels mounted to the frame. An open-faced tub 14 can be provided within the chassis 12 and can at least partially define a treating chamber 16, having an open face, for washing dishes. A door assembly 18 can be movably mounted to the dishwasher 10 for movement between opened and closed positions to selectively open and close the open face of the tub 14. Thus, the door assembly 18 provides accessibility to the treating chamber 16 for the loading and unloading of dishes or other washable items.

It should be appreciated that the door assembly 18 can be secured to the lower front edge of the chassis 12 or to the lower front edge of the tub 14 via a hinge assembly (not shown) configured to pivot the door assembly 18. When the door assembly 18 is closed, user access to the treating chamber 16 can be prevented, whereas user access to the treating chamber 16 can be permitted when the door assembly 18 is open.

Dish holders, illustrated in the form of upper and lower dish racks 26, 28, are located within the treating chamber 16 and receive dishes for washing. The upper and lower racks 26, 28 are typically mounted for slidable movement in and out of the treating chamber 16 for ease of loading and unloading. Other dish holders can be provided, such as a silverware basket. As used in this description, the term "dish(es)" is intended to be generic to any item, single or plural, that can be treated in the dishwasher 10, including, without limitation, dishes, plates, pots, bowls, pans, glassware, and silverware.

A spray system is provided for spraying liquid in the treating chamber 16 and is provided in the form of a first lower spray assembly 34, a second lower spray assembly 36, a rotating mid-level spray arm assembly 38, and/or an upper spray arm assembly 40. Upper spray arm assembly 40, mid-level rotatable sprayer 38 and lower rotatable sprayer 34 are located, respectively, above the upper rack 26, beneath the upper rack 26, and beneath the lower rack 28 and are illustrated as rotating spray arms. The second lower spray assembly 36 is illustrated as being located adjacent the lower dish rack 28 toward the rear of the treating chamber 16. The second lower spray assembly 36 is illustrated as including a vertically oriented distribution header or spray manifold 44. Such a spray manifold is set forth in detail in U.S. Pat. No. 7,594,513, issued Sep. 29, 2009, and titled "Multiple Wash Zone Dishwasher," which is incorporated herein by reference in its entirety.

A recirculation system is provided for recirculating liquid from the treating chamber 16 to the spray system. The recirculation system can include a sump 30 and a pump assembly 31. The sump 30 collects the liquid sprayed in the treating chamber 16 and can be formed by a sloped or recess portion of a bottom wall of the tub 14. The pump assembly 31 can include both a drain pump 32 and one or more recirculation pumps 33. The drain pump 32 can draw liquid from the sump 30 and pump the liquid out of the dishwasher 10 to a household drain line (not shown). The recirculation pump 33 can draw liquid from the sump 30 and the liquid can be simultaneously or selectively pumped through a supply tube 42 to each of the assemblies 34, 36, 38, 40 for selective spraying. While not shown, a liquid supply system can include a water supply conduit coupled with a household water supply 108 for supplying water to the treating chamber 16. The household water supply 108 can include a household cold water supply, household hot water supply, or a mixture as desired.

A heating system including a heating element 46 can be located within the sump 30 for heating the liquid contained in the sump 30.

A controller 50 can also be included in the dishwasher 10, which can be operably coupled with various components of the dishwasher 10 to implement a cycle of operation. The controller 50 can be located within the door assembly 18 as illustrated, or it can alternatively be located somewhere within the chassis 12. The controller 50 can also be operably coupled with a control panel or user interface 56 for receiving user-selected inputs and communicating information to the user. The user interface 56 can include operational controls such as dials, lights, switches, and displays enabling a user to input commands, such as a cycle of operation, to the controller 50 and receive information.

Figure 2:
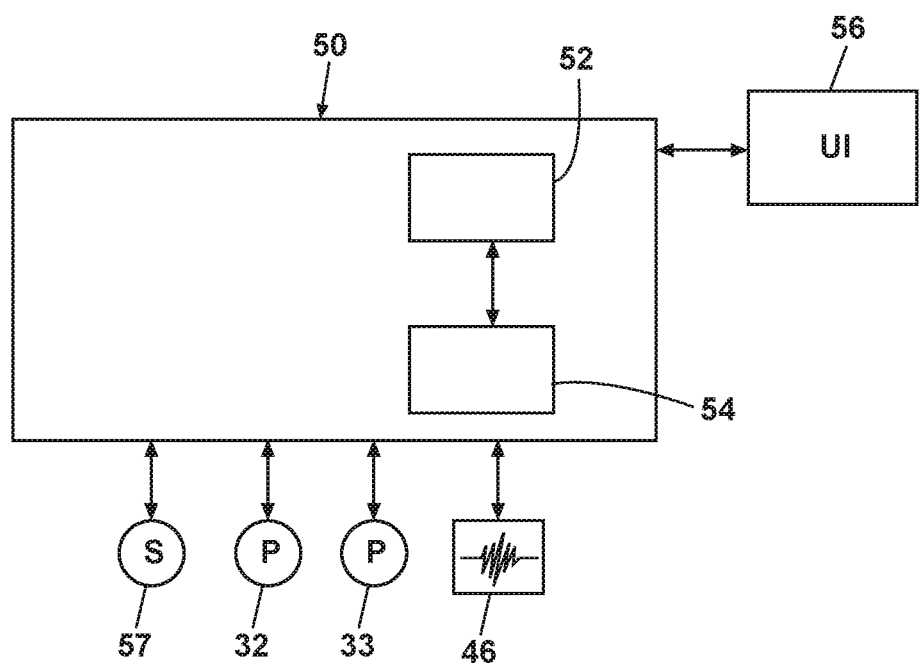
FIG. 2 is a schematic view of a controller of the dishwasher of FIG. 1.

As illustrated schematically in FIG. 2, the controller 50 can be coupled with the heating element 46 for heating the wash liquid during a cycle of operation, the drain pump 32 for draining liquid from the treating chamber 16, and the recirculation pump 33 for recirculating the wash liquid during the cycle of operation. The controller 50 can be provided with a memory 52 and a central processing unit (CPU) 54. The memory 52 can be used for storing control software that can be executed by the CPU 54 in completing a cycle of operation using the dishwasher 10 and any additional software. For example, the memory 52 can store one or more pre-programmed cycles of operation that can be selected by a user and completed by the dishwasher 10. The controller 50 can also receive input from one or more sensors 57. Non-limiting examples of sensors that can be communicably coupled with the controller 50 include a temperature sensor, humidity sensor, and turbidity sensor to determine the soil load associated with a selected grouping of dishes, such as the dishes associated with a particular area of the treating chamber 16.

Figure 3:
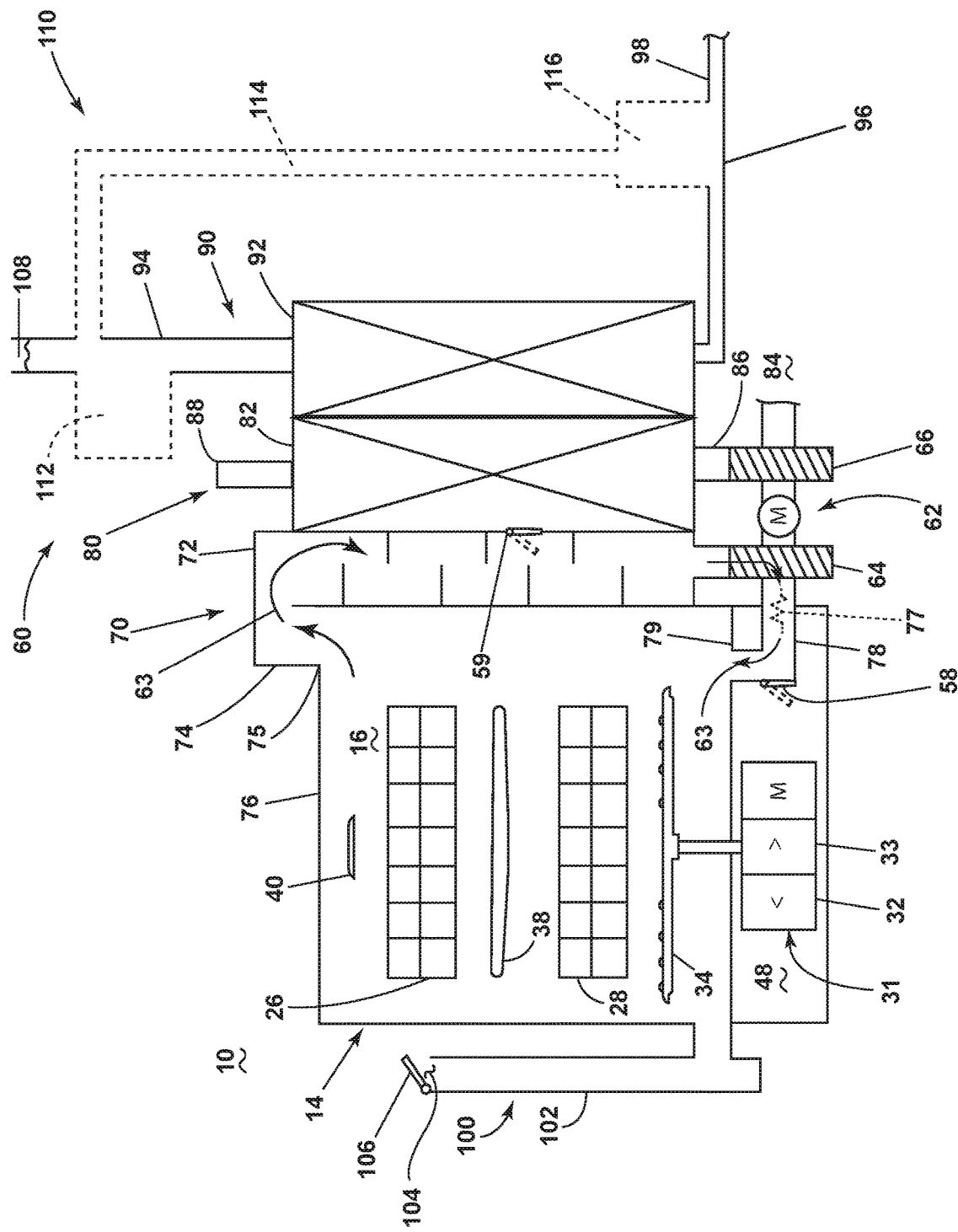
FIG. 3 is a schematic view of a closed loop drying system of the dishwasher of FIG. 1.

FIG. 3 is a schematic front view of the dishwasher 10 from FIG. 1 having the controller 50 of FIG. 2. A drying system 60 can be provided for removing moisture from the treating chamber 16 during a drying cycle of the dishwasher 10. The drying system 60 includes a condensing system 70, an ambient air heat exchange system 80, and a cold water heat exchange system 90. The condensing system 70 is fluidly coupled to the treating chamber 16 such that moist air in the treating chamber 16 is recirculated through the condensing system 70 to condense liquid from the moist air and thereby dry the contents of the treating chamber 16. The ambient air heat exchange system 80 flows ambient air over at least a portion of the condensing system 70 to increase the temperature differential between the condensing system 70 and the moist air to increase the rate of condensing. Similarly, the cold water heat exchange system 90 flows cold water over at least a portion of the condensing system 70 or the ambient air heat exchange system 80 to also increase the temperature differential between the condensing system 70 and the moist air to increase the rate of condensing.

The condensing system 70 includes a condenser 72 with a supply segment 74 fluidly coupled to the treating chamber 16 upstream of the condenser 72 and a return segment 78 fluidly coupled to the treating chamber 16 downstream of the condenser 72. A fan 62 has a first stage 64 fluidly located within the return segment 78. Operation of the fan 62 results in moist air being supplied to the condenser 72 through the supply segment 74 and returned to the treating chamber 16 through the return segment 78. An additional fan or the fan 62 can also be a single stage. The additional fan or the fan 62 can be located upstream of the condenser 72 to move moist air from treating chamber 16 through condensing system 70. When operated in these manners, the condensing system 70 is operated in a closed loop mode, without the addition of ambient air to the moist air.

The supply segment 74 includes an inlet opening 75 in fluid communication with a first portion of the treating chamber 16. As shown herein, the inlet opening 75 can be formed in an upper wall 76 of the treating chamber 16, although other locations are possible. The return segment 78 can include an outlet 79, downstream of the first stage 64, fluidly coupled to a lower portion of the treating chamber 16, although other locations are possible.

Additionally, a heating element can be incorporated in one or more locations of the condensing system 70 to heat the moist air to increase the moisture carrying capacity of the moist air. The heating element can be the heating element 46 (FIG. 1) in the treating chamber 16 or it can be a dedicated heating element 77 located in the condensing system 70. Optionally, a portion of the return segment 78 can pass through the motor compartment 48 where the heat generated by components in the motor compartment 48 can heat the moist air in the return segment 78. A further option for heating the moist air and adding moisture carrying capacity can include a first controllable gate 58 in the return segment 78 to fluidly couple the motor compartment 48 to the return segment 78. When the first controllable gate 58 is opened, warm air is drawn from the motor compartment 48 into the return segment 78, which will supply a charge of warm, ambient air to the moist air flowing through the return segment 78. By "warm, ambient air", it is meant that the air is at a higher temperature than an ambient air 84. The ambient air 84 includes, for example, air from the environment exterior of the dishwasher 10 or at least exterior of the treating chamber 16. Typically, the air in the motor compartment 48 is approximately 4° C. warmer than the ambient air 84, at least when the first controllable gate 58 is initially opened. The warm, ambient air is also normally dryer than the air in the treating chamber 16, at least when the first controllable gate 58 is initially opened. When the first controllable gate 58 is opened and a charge of warm, ambient air is introduced into the return segment 78, the condensing system 70 is operated in an open loop mode, until the first controllable gate 58 is closed, at which time, the condensing system 70 is returned to operating in a closed loop mode. Once the condensing system 70 is returned to operating in a closed loop mode, a mixture of moist air and warm, ambient air can flow through the condenser 72 of the condensing system 70.

The ambient air heat exchange system 80 includes an ambient air heat exchanger 82 in thermal transfer relationship with the condenser 72. The ambient air heat exchanger 82 is supplied ambient air 84 by an ambient air supply segment 86 and an exhaust segment 88 exhausts the ambient air downstream of the ambient air heat exchanger 82 to the surrounding environment, such as the ambient air within or exterior of the appliance. A second stage 66 of the fan 62 is fluidly coupled to the ambient air supply segment 86 to serially flow ambient air 84 through the ambient air supply segment 86, ambient air heat exchanger 82, and exhaust segment 88. The ambient air heat exchanger 82 can guide ambient air 84 into direct contact to the outside of the condenser 72. Alternatively, the ambient air heat exchanger 82 can guide ambient air 84 into a conduit (or any other form of pipe, tank, reservoir, etc.) that is in contact with the outside of the condenser 72.

Optionally, a second controllable gate 59 can fluidly connect the ambient air heat exchange system 80 to the condensing system 70. The second controllable gate 59, when open, can provide a charge of ambient air 84 from the ambient air heat exchange system 80 into the condensing system 70. When the second controllable gate 59 is opened, the condensing system 70 temporarily functions as an open loop condensing system, until the second controllable gate 59 is closed, then the condensing system 70 returns to closed loop operation. Once the condensing system 70 is returned to operating in a closed loop mode, a mixture of moist air and ambient air can flow through the condenser 72 of the condensing system 70.

The cold water heat exchange system 90 includes a cold water heat exchanger 92 in thermal transfer relationship with the condenser 72. The cold water heat exchanger 92 is downstream of a water supply segment 94 and upstream of a water outlet segment 96. The water supply segment 94 couples to a household water supply 108, which, for most homes, provides cold water at a temperature cooler than ambient air. In many homes the household cold water is around 20° C. or cooler. The cold water is supplied to the cold water heat exchanger 92 via the water supply segment 94. Optionally, the cold water heat exchanger 92 can be upstream of the water supply segment 94.

A water outlet segment 96 is fluidly coupled downstream to the cold water heat exchanger 92 and can further connect to a water channel 98. The water channel 98 can be upstream of a household drain or can fluidly connect to the treating chamber 16, such as the sump 30 (FIG. 1) in the treating chamber 16. In addition, the cold water heat exchange system 90 or the water channel 98 can include or be coupled to any number of valves, conduit, or pumps normally found in the dishwasher. For example, the drain or recirculation pumps 32, 33 can be coupled to the water channel 98 for use in pumping the cold water through the cold water heat exchanger 92, instead of relying solely on the water pressure of the household water supply 108.

Optionally, the water outlet segment 96 can fluidly connect to a water recirculation system 110. The water recirculation system 110 can include a first water storage area 112, a second water storage 116, and a water recirculation segment 114. The second water storage area 116 can be downstream of the water outlet segment 96 and upstream of the water channel 98. The second water storage 116 area can also be connected to a water recirculation segment 114 which can be coupled to either the first water storage area 112 or the water supply segment 94. Alternatively, the location of the connection of the water recirculation segment 114 can be at any point such that it can fluidly connect a location downstream of the cold water heat exchanger 92 to a location upstream of the cold water heat exchanger 92. Further, the water recirculation system 110 can have any number of storage areas and is not restricting the location or number to that in the disclosure. In addition, the water recirculation system 110 can include or be coupled to any number of valves, conduit, or pumps.

The water recirculation system 110 can be used to recirculate cold water from the household water supply 108 through the cold water heat exchanger 92. In this way, a charge of cold water can be supplied to the cold water heat exchange system 90 and recirculated through the cold water heat exchanger 92. The recirculation of a charge of cold water has the benefit of using less water than a continuous supply of cold water, which is contemplated. The disadvantage of the recirculation of a charge of cold water is that the cold water becomes heated over time and creates less of a temperature differential with the moist air. The continuous supply of cold water has the benefit of greater cooling, with the disadvantage of more cold water consumed. One way to remediate the extra use of water for cooling is to store the cold water in one of the first or second water storage areas 112, 116 for reuse later in the current cycle of operation or in a subsequent cycle of operation.

Optionally, the dishwasher 10 can further include a water regeneration system 100 for regenerating softening agents used by a water softener (not shown) and having a regeneration tank 102 in fluid communication with the treating chamber 16. The regeneration tank 102 can include a vent 104 that is fluidly coupled with the ambient air 84 which permits excess air in the regeneration tank 102 or treating chamber 16 to be exhausted from the dishwasher 10. The vent 104 can be pressure-activated or can be selectively closed by a controllable closure means, such as a valve 106. Alternatively, if no regeneration system is provided with the dishwasher 10, excess air in the treating chamber 16 can be exhausted from the dishwasher 10 via seals around the door assembly 18 (FIG. 1), which can be configured to open at a certain pressure differential between the treating chamber 16 and the environment, or other openings in the treating chamber 16 or the chassis 12.

Figure 4:
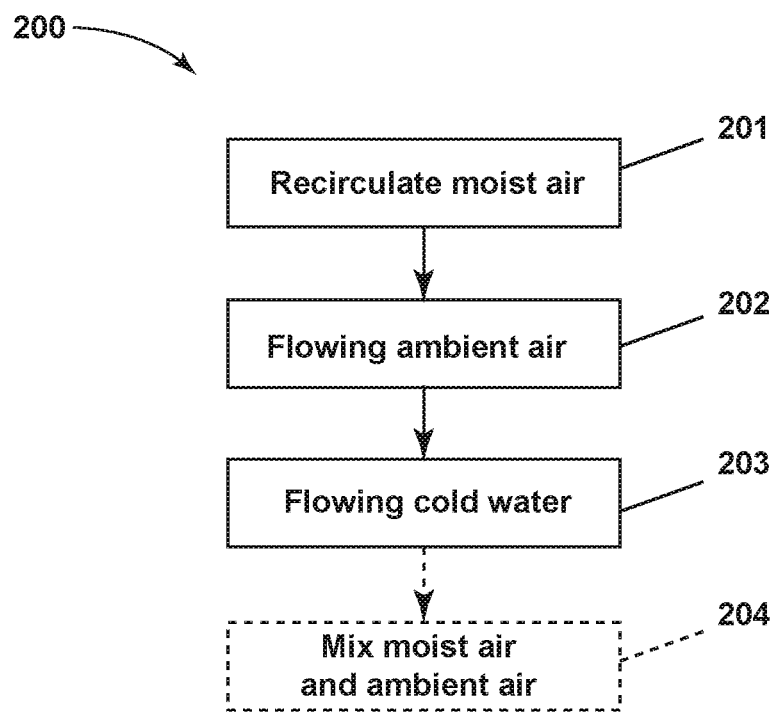
FIG. 4 is a flow chart illustrating a method for removing moisture from moist air that can be utilized in the dishwasher of FIG. 3.

FIG. 4 illustrates a method for removing moisture from moist air 200 within the treating chamber 16 of the dishwasher 10. The method 200 includes the recirculation of moist air at 201 through the condensing system 70, demonstrated by air recirculation arrows 63 in FIG. 3. Other aspects of the method for removing moisture from moist air 200 include flowing ambient air 84 at 202 through the ambient air heat exchange system 80 and flowing cold water at 203 through the cold water heat exchange system 90, wherein the ambient air heat exchanger 82, the cold water heat exchanger 92 are in thermal contact with the condenser 72 of the condensing system 70. The ambient air heat exchanger 82 and the cold water heat exchanger 92 help to precipitate moisture from the air in the condenser 72. The method for removing moisture from moist air 200 can optionally include mixing moist air with warm, ambient air or ambient air 84 at 204. The mixing of moist air with warm, ambient air or ambient air 84 at 204 can include, and is not limited to, the opening and closing of a first controllable gate 58 or a second controllable gate 59. The moist air can also be heated without the addition of warm air.

In a typical cycle of operation, moist air is formed in the treating chamber 16 by a washing, rinsing, or sanitizing cycle. The method 200 can be used to remove moisture from moist air within a treating chamber 16 of a dishwasher 10. At 201 the first stage 64 of the fan 62 recirculates air from the treating chamber 16 into the supply segment 74, through the condenser 72, and back to the treating chamber 16 via the return segment 78. At 202 the second stage 66 of the fan 62 pulls ambient air 84 into the ambient air supply segment 86, through the ambient air heat exchanger 82, and discharges air through the exhaust segment 88. The condenser 72 is in thermal contact with the ambient air heat exchanger 82. Moisture is precipitated from the moist air. The condensed moisture drips down from the condenser 72 and back into the tub 14, and can thereafter be drained or recirculated from or to the dishwasher 10.

In 203, the second stage 66 of the fan 62 ceases to pull in ambient air 84 and cold water from the household water supply 108 flows through the water supply segment 94 to the cold water heat exchanger 92. The cold water heat exchanger 92 is in thermal communication with the condenser 72 of the condensing system 70. The cold water precipitates moisture from the moist air. The condensed moisture drips down from the condenser 72 and back into the tub 14, and can thereafter be drained or recirculated from or to the dishwasher 10. While not illustrated, valves or other components that interface with the second stage 66 of the fan 62 or the input of the household water supply 108 can be controlled by the controller 50.

Downstream of the cold water heat exchanger 92, the water outlet segment 96 can be fluidly connected to the water recirculation system 110 that can include a first or second water storage area 112, 116 and recirculation segment 114. Cold water can be recirculated through the cold water heat exchanger 92 several times using the recirculation segment 114. Water can also accumulate in the first or second water storage areas 112, 116 where it can be stored for reuse during a cycle or in a future cycle. The water outlet segment 96 and the first or second water storage areas 112, 116 can also be coupled to a water channel 98. The water channel 98 allows water to be drained or recirculated to the treating chamber 16.

Step 203 demonstrates a reduction in energy consumption as the second stage 66 of the fan 62 can be turned off while cold water enhances condensation. The water used to enhance condensation is conserved through the storage of water for use in a future cycle or recirculation in the same cycle as previously described.

Another aspect of the present disclosure in 203 is the flow of cold water from the household water supply 108 into a reservoir, so that in the reservoir brings the cold water into direct contact with the outside wall of the condenser 72 or the ambient air heat exchanger 82. The reservoir can be fluidly connected to the water outlet segment 96.

Optional step 204 can occur multiple times during, between, or after any or all of steps 201-203. In optional step 204, the condensing system 70 can briefly or intermittently be opened. The second controllable gate 59 can be opened to allow a charge of ambient air 84 to mix with the air in the condensing system 70. The ambient air 84 can have a lower humidity than the moist air, and can absorb some of the humidity. As a charge of ambient air 84 is introduced into the condensing system 70, and thus into the treating chamber 16, excess air in the treating chamber 16 can be exhausted via the vent 104 of the regeneration system 100 or through other openings in the treating chamber 16. A charge of ambient air 84 can take place at one or more times before, during, or after a cycle of operation. Once the second controllable gate 59 is closed, the condensing system 70 returns to operating as a closed loop.

Optional step 204 can be used to increase the moisture carrying capacity of the moist air by introducing a charge of ambient air or warm, ambient air by the opening and closing of one or both of the first and second controllable gates 58, 59 during, between, or after any of the steps 201-203.

Another aspect of the present disclosure, the ambient air heat exchanger 82 and cold water heat exchanger 92 can each be implemented simultaneously or sequentially for one or multiple times in the drying cycle 47.

Figure 5:
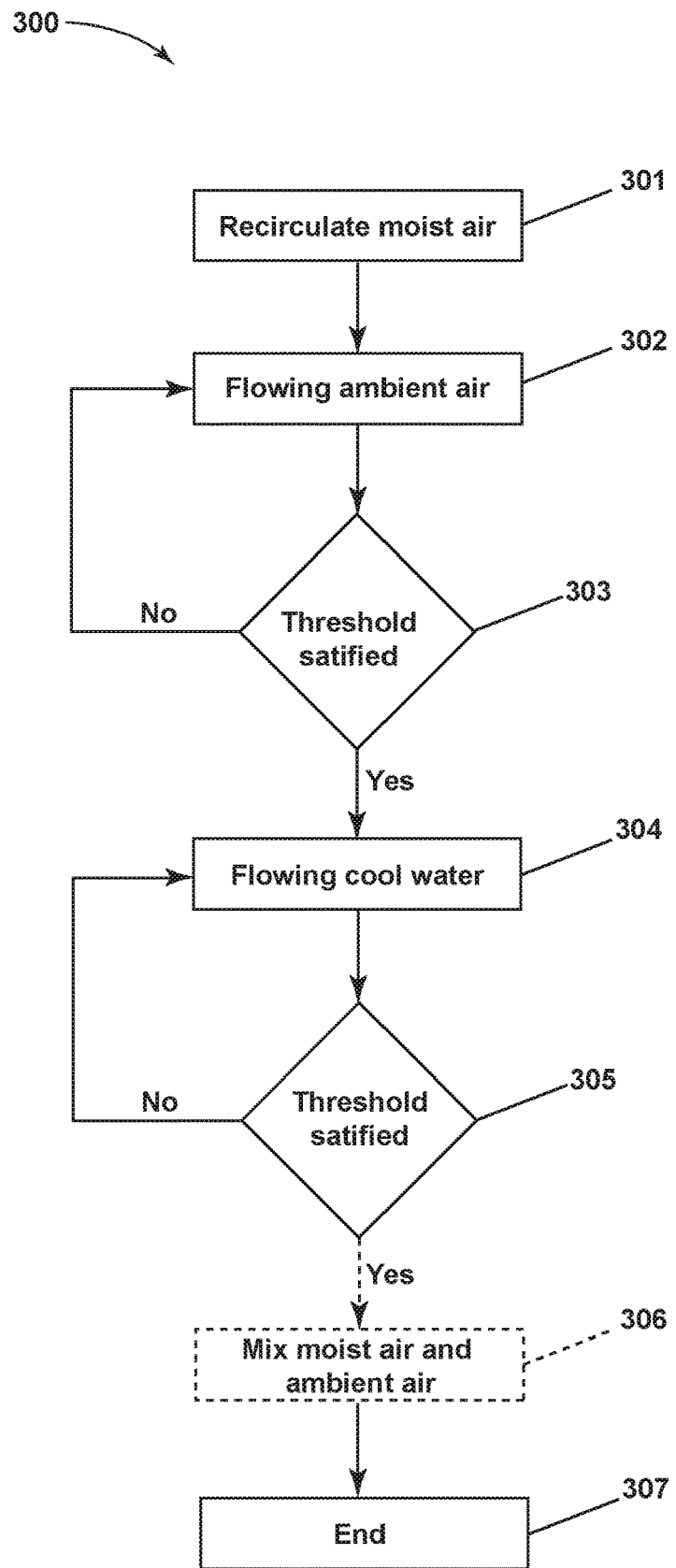
FIG. 5 is a flow chart illustrating another aspect of a method for removing moisture from moist air that can be utilized in the dishwasher of FIG. 3.

FIG. 5 illustrates a specific implementation of the present disclosure; a method for removing moisture from moist air 300 within the treating chamber 16 of the dishwasher 10. The method for removing moisture from moist air 300 includes a recirculation of moist air at 301 through the condensing system 70. Similar to 201, at 302 the recirculating air in the condenser 72 of the condensing system 70 comes into thermal contact with the ambient air heat exchanger 82. The recirculation of moist air at 301 and flow of ambient air at 302 continue until a threshold is satisfied at 303. The threshold could be at least one of, but not limited to: a time, a moisture content of the moist air, or a temperature difference between the moist air and the ambient air. The testing for a threshold could reflect efficiency by measuring an air temperature difference between the moist air in the condensing system 70 and the ambient air in the ambient air heat exchange system 80. At the beginning of a drying cycle, the moist air can have a temperature of approximately 45-68 C. As the temperature differential decreases between the moist air within the treating chamber 16 and the ambient air 84, the efficiency of the condenser 72 also decreases. To take appropriate measurements at 303 one or more sensors 57 can be coupled to a controller 50 to obtain input to establish if a predetermined threshold is satisfied.

Once the at least one threshold is satisfied at 303, recirculation of moist air continues at 301, flowing ambient air ceases, and a flowing of cold water begins at 304 from the household water supply 108 through a cold water heat exchange system 90. The cold water heat exchanger 92 of the cold water heat exchange system 90 is thermal contact with the condenser 72 of the condensing system 70. The recirculation of moist air at 301 and the flowing of cold water at 304 continues until a threshold is satisfied at 305 for at least one of, and not limited to: a time, a moisture content of the air, or a temperature difference between the moist air and the cold water. The efficiency of the condensation depends on a temperature differential between the moist air in the condenser 72 and the cold water in the cold water heat exchanger 92. Cold water can enter the dishwasher 10 at a temperature of 20° C. or less, increasing efficiency and reducing the length of time needed to dry the dishes in the treating chamber 16. At 305 one or more sensors 57 coupled to a controller 50 can provide input to establish if a predetermined threshold is satisfied. If satisfied; the method can end at 307.

Optionally at 306, a charge occurs of warm, ambient air or ambient air into the recirculated moist air. Optional set 306 can occur at any time or at multiple times during the method for removing moisture from moist air 300. The charge of warm, ambient air or ambient air at 306 can include, and is not limited to, the opening and closing of a first or second controllable gate 58, 59.

Figure 6:
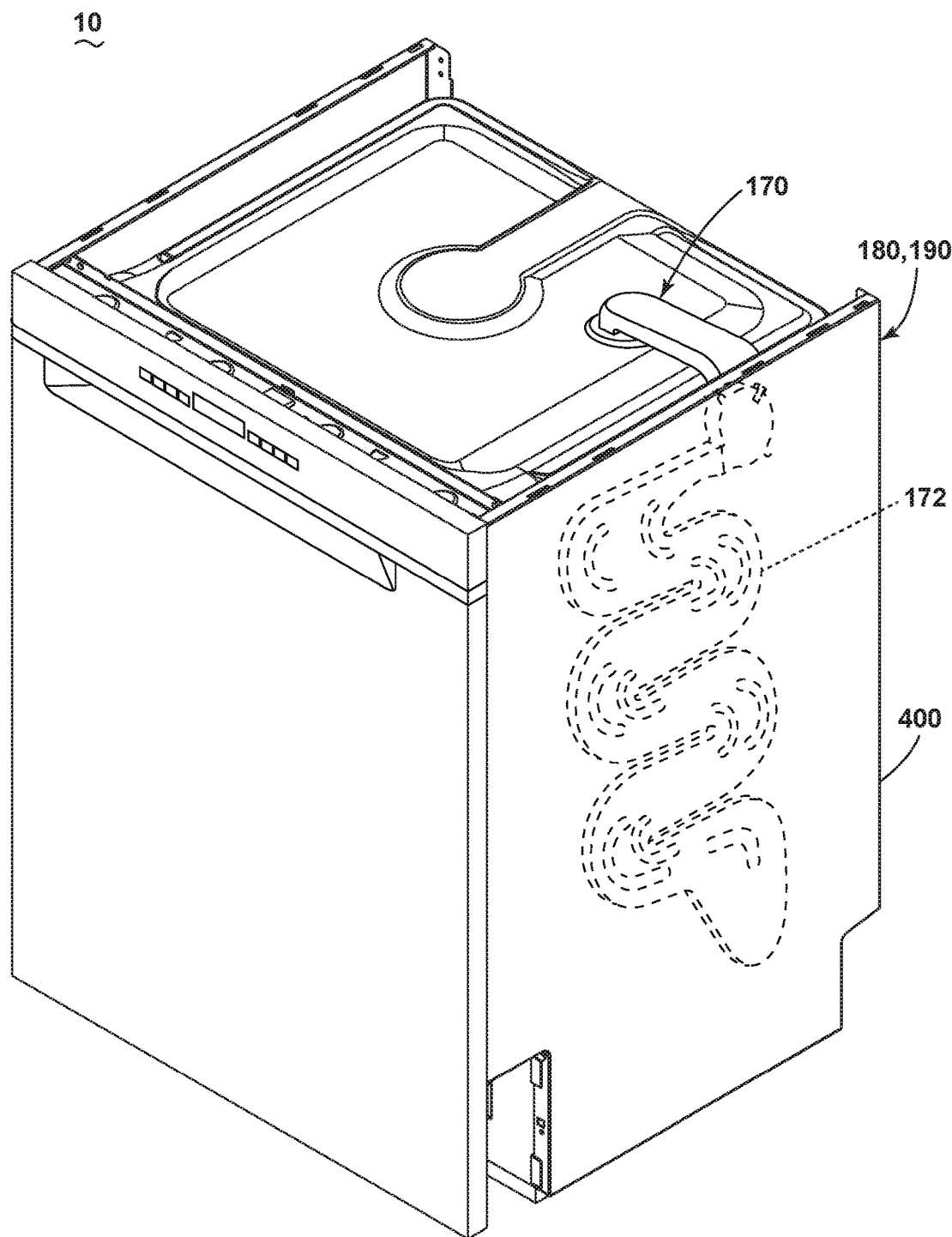
FIG. 6 is a perspective view of a dishwasher in accordance with various aspects described herein.

FIG. 6 illustrates a perspective view of a dishwasher 10 in accordance with various aspects described herein with a specific implementation of a condensing system 170, ambient air heat exchange system 180, and cold water heat exchange system 190, which operate in the same manner as previously described. The condensing system 170 includes a serpentine condenser 172 positioned inside a tank 400 formed on the side of the dishwasher 10. The tank 400 can function as both an ambient air heat exchanger and a cold water heat exchanger. When used as an ambient air heat exchanger, ambient air 84 flows through the tank 400, where the ambient air 84 comes into direct thermal contact with the serpentine condenser 172. When used as a cold water heat exchanger, cold water is flowed into or through the tank 400, where the cold water comes into direct thermal contact with the serpentine condenser 172.

The methods 200, 300 disclosed herein reduces the moisture in moist air of the treating chamber 16 of a dishwasher 10. One advantage that can be realized is the utilization of both ambient air 84 at 202, 302 and cold water at 203, 304 to enhance condensation. An improvement in the efficiency of condensation will reduce drying time as well as the overall cycle time of the dishwasher 10. Reducing drying time and cycle time also reduces energy consumption.

Another advantage that can be realized in the aspects of the present disclosure is the possibility that ambient air 84 is mixed with moist air at 204, 306 to reduce overall moisture level. A reduction in moisture level can reduce drying time.

Another advantage that can be realized in the aspects of the present disclosure is the possibility that a charge of warm, ambient air from the first controllable gate 58 is mixed with moist air at 204, 306 to reduce overall moisture level and increase the efficiency of the drying system 60. Reduction in moisture level can reduce drying time or conserve energy.

Another advantage that can be realized in the aspects of the present disclosure is the possibility of water storage (112, 116) for reuse of the flowing cold water. After flowing cold water (203, 304) enhances condensation, the water can be stored in a water storage area (112, 116) for reuse in the current or future cycle.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

What is claimed is:

1. A method of removing moisture from moist air within a treating chamber of a dishwasher, the method comprising:
    recirculating the moist air in the treating chamber through a condenser; wherein at least a portion of the recirculating the moist air is conducted without addition of ambient air to the moist air;
    during the recirculating, flowing ambient air over the condenser;
    during the recirculating and after the flowing ambient air, flowing cold water over the condenser; and
    adding ambient air with the moist air to form a mixture of moist air and ambient air.

2. The method of claim 1 wherein the mixture is recirculated through the condenser.

3. The method of claim 1 wherein the addition of the ambient air occurs prior to at least one of the flowing ambient air over the condenser or flowing cold water over the condenser.

4. The method of claim 1 wherein the addition of the ambient air occurs after to at least one of the flowing ambient air over the condenser or flowing cold water over the condenser.

5. The method of claim 1 wherein the flowing ambient air continues until a predetermined threshold is satisfied.

6. The method of claim 5 wherein the predetermined threshold comprises at least one of an air temperature difference between the moist air and the ambient air or a moisture content of the moist air.

7. The method of claim 5 wherein the predetermined threshold comprises at least one of a temperature difference between the moist air and the cold water or a moisture content of the moist air.

8. The method of claim 1 wherein the flowing ambient air over the condenser comprises directly contacting the condenser with the ambient air.

9. The method of claim 1 wherein the flowing cold water over the condenser comprises directly contacting the condenser with the cold water.

10. The method of claim 1 wherein the flowing cold water over the condenser comprises flowing cold water through a conduit in thermal contact with the condenser.

11. The method of claim 1 wherein the flowing cold water comprises supplying the cold water from a household cold water supply.

12. The method of claim 11 further comprising storing the cold water from the household cold water supply in a reservoir within the dishwasher.

13. The method of claim 12 wherein the flowing of cold water over the condenser further comprises recirculating the cold water from the reservoir through a conduit in thermal communication with the condenser and back to the reservoir.

14. The method of claim 1 wherein the cold water is stored for reuse during a cycle of operation.

15. A method of removing moisture from moist air within a treating chamber of a dishwasher, the method comprising:
    recirculating the moist air in the treating chamber through a condenser;
    during the recirculating, flowing ambient air over the condenser until a threshold is satisfied for at least one of a time, a moisture content of the moist air, or a temperature difference between the moist air and the ambient air; and
    during the recirculating and after the flowing ambient air, flowing cold water from a household water supply over the condenser until a threshold is satisfied by at least one of a time, a moisture content of the moist air, or a temperature difference between the moist air and the ambient; and
    storing the cold water for reuse during a cycle of operation of the dishwasher.

16. The method of claim 15 further comprising adding ambient air with the moist air to form a mixture of moist air and ambient air.

17. The method of claim 16 wherein the addition of ambient air occurs during at least one of the flowing of ambient air or flowing of cold water.

18. A method of removing moisture from moist air within a treating chamber of a dishwasher, the method comprising:
    storing cold water from a household cold water supply in a reservoir within the dishwasher;
    recirculating the moist air in the treating chamber through a condenser;
    during the recirculating, flowing ambient air over the condenser; and
    during the recirculating and after the flowing ambient air, flowing cold water from the household water supply stored in the reservoir over the condenser.

19. The method of claim 18 wherein at least a portion of the recirculating the moist air is conducted without addition of ambient air to the moist air.

20. The method of claim 19 further comprising adding ambient air with the moist air to form a mixture of moist air and ambient air.

* * * * *